United States Patent Office 3,582,269
Patented June 1, 1971

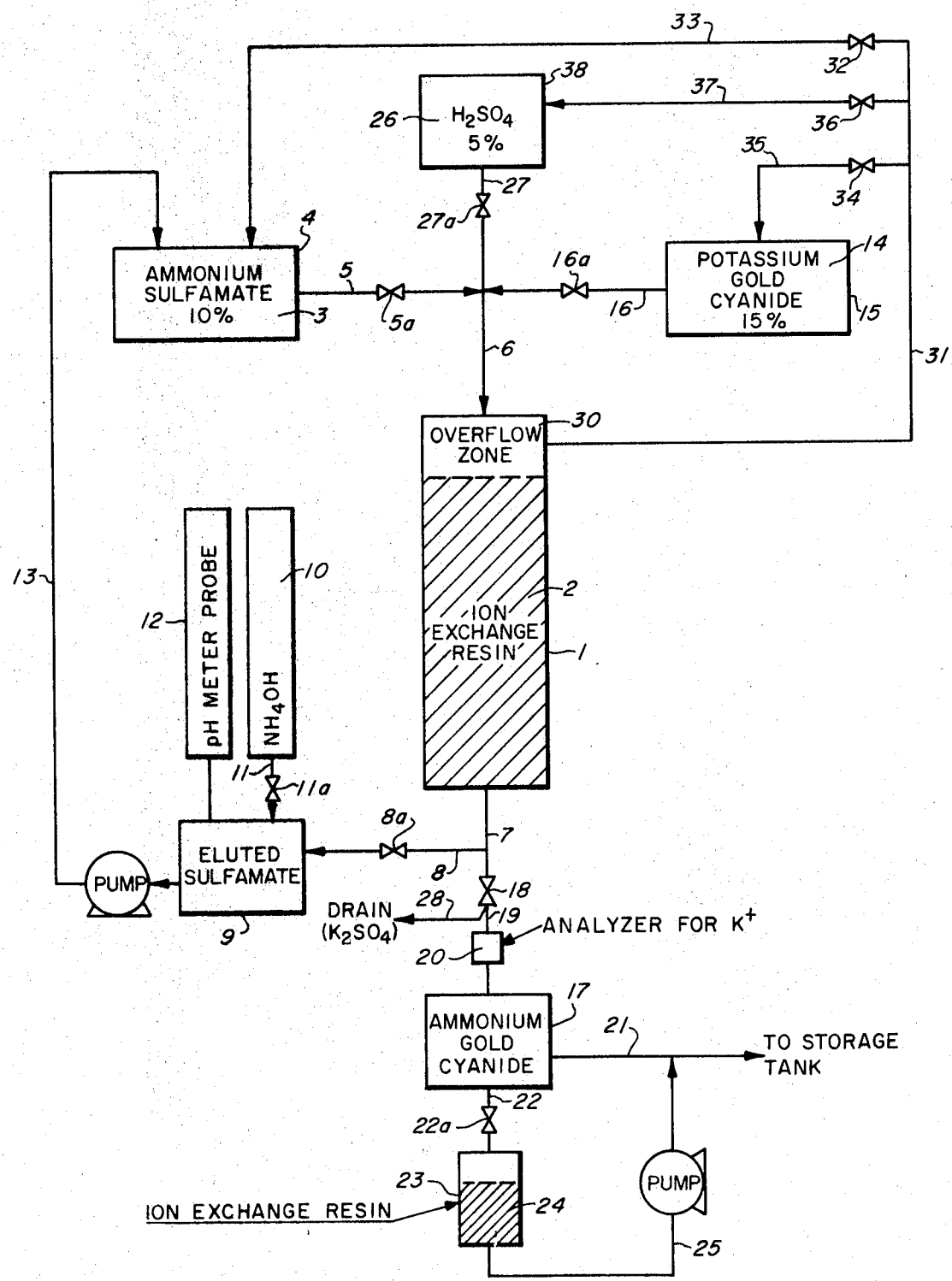

3,582,269
PRODUCTION OF AMMONIUM GOLD CYANIDE
Carl D. Keith, Summit, Alfred J. Haley, Jr., Florham Park, Kenneth D. Baker, Bridgewater, Somerville, and Peter Epstein, Sayerville, N.J., assignors to Engelhard Minerals & Chemicals Corporation, Newark, N.J.
Filed July 3, 1969, Ser. No. 838,946
Int. Cl. C01c 3/08; C01g 7/00; P22c 7/00
U.S. Cl. 23—79
8 Claims

ABSTRACT OF THE DISCLOSURE

An ion exchange process is provided for producing ammonium gold cyanide. The process includes providing a cation exchange resin in ammonium form, e.g. by passing a solution containing an aqueous ammonium salt into contact with a cation exchange resin in hydrogen form to convert the resin to the ammonium form, and subsequently treating the cation exchange resin in ammonium form with a solution containing an alkali gold cyanide to produce ammonium gold cyanide.

BACKGROUND OF THE INVENTION

This invention relates to a process for producing ammonium gold cyanide. More particularly, it relates to an ion exchange process for producing ammonium gold cyanide.

Ammonium gold cyanide is a known compound which has utility as a source of gold in gold plating solutions, and it has been found, recently, that ammonium gold cyanide may be used as a primary source of gold in an especially effective plating bath. Although in the past it had been taught that ammonium gold cyanide might be used in gold plating solutions, it has been the practice commercially to use potassium and sodium gold cyanides exclusively because of their easy preparation and their availability. While the manufacture of ammonium gold cyanide is known to the art, the methods of producing the complex are expensive in comparison to the production of potassium or sodium gold cyanide. Furthermore, some of the methods for producing ammonium gold cyanide do not provide the purity required for use in electroplating baths and in some cases the method of production is dangerous in that fulminating gold may be formed. As a result, ammonium gold cyanide has been too expensive for practical consideration in commercial gold plating.

It is the object of this invention to provide a new and improved commercially feasible process for producing essentially pure ammonium gold cyanide and furthermore to produce ammonium gold cyanide by a relatively non-hazardous method. Still another object of this invention is to provide an ion exchange process for producing ammonium gold cyanide.

It has now been found that ammonium gold cyanide can be prepared by an ion exchange process. This process is simple and economical and commercially feasible. Moreover, the ammonium gold cyanide formed by such process is of sufficient purity to be used effectively in a bath for the electro-deposition of gold.

THE INVENTION

In accordance with this invention ammonium gold cyanide is produced by a process which comprises providing a cation exchange resin in ammonium form and passing an aqueous solution of an alkali metal gold cyanide into contact with such cation exchange resin in ammonium form, thereby exchanging ammonium ions of the resin for alkali metal ions in the solution and producing an effluent containing ammonium gold cyanide.

In order to produce ammonium gold cyanide that is essentially pure and compatible for electroplating solutions, it is preferable to start with the acid form of a cation exchange resin and convert it to the ammonium form. And, it is one aspect of this invention that a suitable cation exchange resin in ammonium form is provided both with respect to economics of the process and the purity of the product.

Generally cation exchange resins are available or can easily be converted to the hydrogen form. In order to convert the resin to the ammonium form, hydrogen ions must be exchanged for ammonium ions. Ammonium hydroxide, the most obvious reagent for such conversion, was found to be unsatisfactory in that the resin was degraded too rapidly or the conversion was too cumbersome for practical consideration. After a few cycles using, for example, 5 to 10% $NH_4OH$, the resin tends to break down. This degradation is believed to result from the heat produced by the neutralization reaction of $NH_4OH$ with the resin. When a more dilute solution is used, e.g. 4% $NH_4OH$, the large volume of reagent which must be used makes the procedure cumbersome.

It was found that the cation exchange resins in hydrogen form are readily converted to the ammonium form and have long life when the the conversion is effected by exchange with ammonium salts. It is therefore a preferred embodiment of this invention to provide the cation exchange resin in ammonium form by passing an aqueous solution of an ammonium salt into contact with a cation exchange resin in hydrogen form, thereby exchanging hydrogen ions of the resin for ammonium ions in the solution. Ammonium salts such as phosphates, sulfates or sulfamates are examples of suitable ammonium compounds for conversion of the resin to ammonium form. Ammonium sulfamate is a preferred salt for the conversion, if the product ammonium gold cyanide is to be used in a plating process.

The ammonium salt, which has been used for ammonium ion exchange with hydrogen in the resin, is either partially or entirely converted to the acid. It can be reused by adjusting the pH of the eluted solution, e.g. with $NH_4OH$. The adjusted pH depends on the ammonium salt used. For example, if 10% aqueous solution of ammonium sulfamate is used the pH is adjusted to about 5.6.

The ammonium gold cyanide is produced by passing an aqueous solution of alkali metal gold cyanide, e.g. $KAu(CN)_2$ or $NaAu(CN)_2$, into contact with the cation exchange resin in ammonium form, thereby exchanging ammonium ions of the resins for alkali metal ions in the solution.

The cation exchange resin in alkali metal form is regenerated by treatment with an acid, e.g. $H_2SO_4$, restoring the resin to hydrogen form. The cycle converting the resin to the ammonium form is then repeated.

Suitably the cation exchange material useful for this invention is a cation exchange resin in hydrogen form that is capable of providing hydrogen ions for exchange with ammonium ions in solution. Examples of the cation exchange resins which may be used in this invention are highly sulfonated styrene-divinylbenzene copolymers. Such resins are commercially available under the names Amberlite IR-120 (from Rohm and Haas Company), Permutit Q (from The Permutit Company), Dowex 50 (from the Dow Chemical Company), and Ionac C-250 (from Ionac Chemical Co.) and the like. A preferred cation exchange resin for use in the process of this invention is Amberlite IR-120.

This invention will be better understood by reference to the accompanying drawing and example which illustrate a preferred embodiment of this invention.

DRAWING

The drawing is a schematic diagram of an ion exchange process in accordance with this invention. It illustrates the conversion of the cation exchange resin from the hydrogen form to the ammonium form, recovery and recycling of the ammonium salt used in the conversion, the production of ammonium gold cyanide from a solution containing an alkali etal gold cyanide, and regeneration of the resin for reuse.

In the drawing ion exchange column 1 contains a cation exchange resin 2 initially in hydrogen form. A preferred cation exchange material is Amberlite IR–120. An aqueous ammonium sulfamate solution 3, e.g. approx. 10%, which is stored in vessel 4 is passed into contact with the ion exchange resin 2 in column 1 through line 5, valve 5a and line 6 to exchange the ammonium ions in solution for the hydrogen in the resin, and thus converting the cation exchange resin 2 to the ammonium form. The effluent from column 1, i.e. the eluted sulfamate, which is partially or entirely converted to the acid, is passed through lines 7 and 8 and valve 8a to tank 9 for regeneration back to ammonium sulfamate with $NH_4OH$ 10 through line 11 and valve 11a. A slight excess of $NH_4OH$ is added to the eluted sulfamate to bring the pH to about 5.6, as tested by pH probe 12. The reconstituted ammonium sulfamate is pumped to vessel 4 by way of line 13 and is ready for further use.

An aqueous solution of an alkali metal gold cyanide 14, e.g. about 15% $KAu(CN)_2$, in vessel 15 is passed by way of line 16, valve 16a and line 6 into column 1 and therein into contact with the cation exchange resin 2, now in ammonium form, to exchange the alkali metal ions, e.g. the $K^+$, in solution for ammonium ions in the resin. The ammonium gold cyanide, formed in this process, is passed to vessel 17 through lines 7, valve 18 and line 19. A purity detecting device 20, e.g. an X-ray Fluorescence Analyzer or an Atomic Absorption Analyzer, is disposed in line 19 in order to analyze for the presence of alkali metal ions, e.g. $K^+$. If the ammonium gold cyanide has the required purity it is withdrawn to the storage tank (not shown) through line 21. In the event the ammonium gold cyanide is not of sufficient purity it is passed through line 22 and valve 22a into an ion exchange resin polishing column 23, containing a cation exchange resin in ammonium form 24. The system for preparing the cation exchange resin 24 in ammonium form is not shown, but it may be operated using connecting lines to vessel 4 and tank 9. Generally, at most only traces of alkali metal ion will be present in the ammonium gold cyanide passed to vessel 17 and these traces will be removed in column 23. The effluent product from column 23 can be further subjected to purity tests or passed directly to the storage tank (not shown) through line 25.

The ion exchange resin 2 which is in alkali metal form, e.g. $K^+$ form, after treatment with the solution of alkali metal cyanide is then regenerated by treatment with an acid 26, e.g. 5% $H_2SO_4$, by passage of the acid through line 27, valve 27a and line 6 into column 1. The salt, e.g. $K_2SO_4$, formed in the regeneration is drained from the column through line 7 valve 18, and line 28.

An overflow zone 30 is provided in column 1 above the resin 2. The purpose of the overflow zone is to maintain a suitable head of fluid over the resin in order to prevent channeling of the solutions resulting in incomplete conversion. The overflow solutions are returned to the respective tanks during each conversion cycle. For example, the ammonium sulfamate solution is returned by way of line 31 valve 32 and line 33 to vessel 4 during the conversion of the resin from the hydrogen to the ammonium form; the solution of alkali gold cyanide is returned by way of line 31, valve 34 and line 35 to vessel 15 during the cycle producing ammonium gold cyanide; and the solution of sulfuric acids returned by way of line 31, valve 36 and line 37 to tank 38 in the regeneration cycle.

The reactions which occur in the embodiment of the ion exchange process shown in the drawing can be represented as follows:

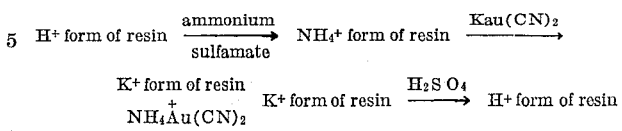

EXAMPLE

Production of ammoniated ion exchange resin

An aqueous solution of approximately 10% by weight ammonium sulfamate is passed through an ion exchange column containing Amberlite IR–120. The resin is a highly sulfonated copolymer of styrene and divinylbenzene, having an operating capacity of 4.4 milliequivalents per gram (dry weight basis) thus absorbing a maximum of 4.4 milliequivalents of ammonium ions per gram of resin.

The ammonium ions in the solution are absorbed by the resin and exchanged for hydrogen ions in the resin, thus producing an ammoniated form of the resin. The resultant effluent from the column containing the sulfamate is entirely or partially in acid form. The acidified sulfamate in the effluent is treated with $NH_4OH$ to a pH of 5.5–6.0 and the regenerated ammonium sulfamate is thus ready for reuse.

Production of $NH_4Au(CN)_2$

An aqueous solution of approximately 15% potassium gold cyanide is passed into the column containing the ammoniated ion exchange resin. The potassium ions are absorbed by the resin and exchanged for ammonium ions in the resin, producing an effluent containing ammonium gold cyanide, which is withdrawn from the column as an aqueous solution 9% ammonium gold cyanide at 1 liter per cubic foot of resin per minute.

The ammonium gold cyanide solution prepared in this manner is virtually free of potassium ion as shown by atomic absorption analysis test. The solution was evaporated to dryness, producing a white crystalline material which assayed 72.90% Au and 5.90% $NH_4$. The theoretical values are 73.76% and 6.78%, respectively.

Regeneration of resin

A 5% solution of $H_2SO_4$ is fed into the cation exchange resin in $K^+$ form to exchange hydrogen for potassium ions. A total of 50 liters/cu. ft. resin of acid is used to insure substantial regeneration of the resin to hydrogen form. The regenerated acidified resin may be contacted with the regenerated ammonium sulfamate and the process repeated.

It will be appreciated that while the present invention has been described with reference to specific embodiments, modification and substitutions can be made without departing from the spirit of this disclosure.

What is claimed is:

1. A process for the production of ammonium gold cyanide which comprises:
   (a) providing a cation exchange resin in ammonium form, and
   (b) then passing an aqueous solution of an alkali metal gold cyanide into contact with the cation exchange resin in ammonium form, thereby exchanging ammonium ions of the resin for the alkali metal ions in the solution and producing an effluent containing ammonium gold cyanide.

2. A process of claim 2 wherein the cation exchange resin is provided in ammonium form is provided by passing an aqueous solution of an ammonium salt with contact with a cation exchange resin in hydrogen form, thereby exchanging the hydrogen ions of the resin for ammonium ions in the solution.

3. A process of claim 2 wherein the ammonium salt is a sulfamate, phosphate, or sulfate.

4. A process of claim 3 wherein the ammonium salt is ammonium sulfamate.

5. A process of claim 1 wherein the alkali metal cyanide is potassium gold cyanide.

6. A process of claim 1 wherein the alkali metal cyanide is sodium gold cyanide.

7. A process of claim 1 wherein the cation exchange resin is a sulfonic acid resin.

8. A process of claim 7 wherein the cation exchange resin is a highly sulfonated copolymer of styrene-divinylbenzene.

References Cited

Mellor: Comprehensive Treatise on Inorganic and Theoretical Chemistry, vol. 3, (1923), p. 583.

OSCAR R. VERTIZ, Primary Examiner

H. S. MILLER, Assistant Examiner

U.S. Cl. X.R.

23—50BE; 75—101BE